United States Patent [19]
Brun et al.

[11] 3,984,328
[45] *Oct. 5, 1976

[54] MEMBRANE ON A HOLLOW CORD

[75] Inventors: Robert Brun, Bollene; Michel Pages, St. Martin d'Ardeche, both of France

[73] Assignee: Rhone-Poulenc S.A., Paris, France

[ * ] Notice: The portion of the term of this patent subsequent to Sept. 10, 1991, has been disclaimed.

[22] Filed: July 30, 1973

[21] Appl. No.: 383,509

[30] Foreign Application Priority Data
Aug. 1, 1972    France .............................. 72.27743

[52] U.S. Cl. ............................ 210/321 R; 210/490; 210/500 M; 264/46.1; 264/323; 427/245
[51] Int. Cl.² ...................... B01D 31/00; B28B 3/00
[58] Field of Search ............. 210/23, 321, 490, 500; 264/46.1, 48, 321, 323; 427/245

[56] References Cited
UNITED STATES PATENTS

| | | | |
|---|---|---|---|
| 3,547,272 | 12/1970 | Shaines | 210/321 |
| 3,676,193 | 7/1972 | Copper et al. | 210/490 X |
| 3,834,546 | 9/1974 | Brun et al. | 210/321 |

OTHER PUBLICATIONS

*The Improvement of Spiral–Wound Reverse Osmosis Membrane Modules,* U.S. Dept. of Int., OSW R & D Report No. 675, pp. 31–47.

*Primary Examiner*—Frank A. Spear, Jr.
*Assistant Examiner*—Ferris H. Lander
*Attorney, Agent, or Firm*—Cushman, Darby & Cushman

[57] ABSTRACT

A flexible semi-permeable tubular assembly is provided which consists essentially of a cord comprising a textile sheath which carries a semi-permeable membrane, said sheath being composed of yarns, the external surface of the sheath being compressed and flattened, the internal surface of the sheath defining an axial channel which communicates with the exterior. This assembly is particularly suitable for the concentration, separation and purification of fluids by reverse osmosis, ultra-filtration and gas permeation. The assembly combines good tensile strength with good porosity.

5 Claims, 1 Drawing Figure

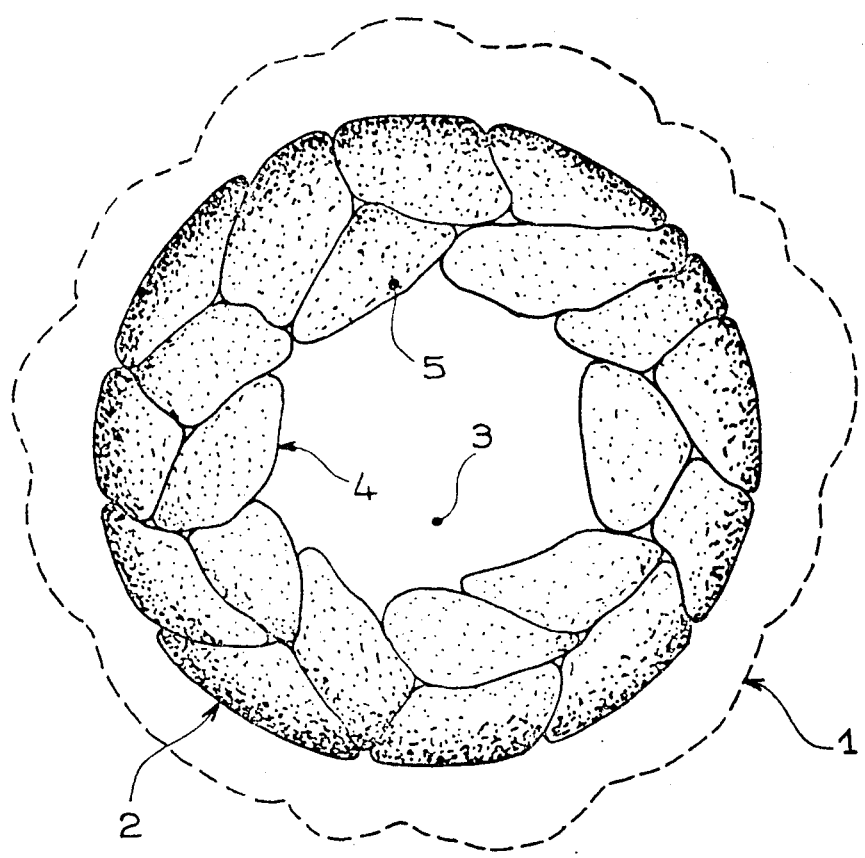

MEMBRANE ON A HOLLOW CORD

The present invention relates to a semi-permeable tubular membrane which can be used especially for treating fluids by reverse osmosis, ultrafiltration or gas permeation.

In U.S. patent application Ser. No. 357,227, now U.S Pat. No. 3,834,546, semi-permeable tubular assemblies are described which can be used for separating fluids and which consist of a cord around which a semi-permeable membrane is applied, said cord comprising a textile sheath surrounding a core composed of at least two longitudinally extending yarns, the core of the cord communicating with the exterior.

These assemblies the external diameter of which is generally between 1 and 8 mm, preferably between 2 and 5 mm, are flexible and thus can be used in various shapes, thus making it possible to improve the hydrodynamic conditions of fluid flow and therefore the efficiency of the apparatus. They can be manufactured continuously, automatically and economically. They enable high pressures to be used and provide a large surface area for a small volume.

The present invention relates to tubular assemblies which possess all the properties of the abovementiond devices and which also make it possible for the fluid which has passed through the membrane to flow at a very high rate, with pressure drops which are relatively very low. Thus the tubular assemblies of the present invention can have considerable unit length which are capable of providing membranes with high permeability.

According to the present invention, there is provided a flexible semi-permeable tubular assembly, which can be used especially in reverse osmosis, ultrafiltration or gas permeation, which consists essentially of a hollow cord around which a semi-permeable membrane is applied, the said cord comprising, around an axial channel which communicates, at least near one of its ends, with the exterior, a textile sheath, the structure of which is compressed and the external surface of which is smoothed, for example by passage through at least one convergent tube.

It has been found, in effect, that it is possible for a cord without a core, consisting of a simple textile sheath covered with a semi-permeable membrane, to withstand external pressures of 20 or 30 bars, which is sufficient to enable it to be used especially in gas permeation, ultrafiltration or reverse osmosis. Without special treatment, a hollow cord is, at best, only resistant to external pressures of the order of a few bars. Such a cord thus possesses an axial channel which improves the flow of the fluids which have passed through the membrane.

According to the present invention, the resistance to crushing of the hollow cord is considerably improved if the structure of the textile sheath is compressed, either by a simple mechanical action, or preferably by a simultaneous mechanical and thermal action. To do this, the hollow cord can be passed through a smooth convergent tube which causes the internal and external diameters of the cord to be reduced and this simultaneously has the effect of regulating its cross-section and of smoothing its external surface.

It has been found that such a treatment gives rise to a textile sheath with a dense homogeneous structure which is permeable to fluids. The adjustment of the size of the hollow cord i.e. its calibration using an accurately cylindrical tube prevents the cord from assuming an oval shape; consequently, its transverse rigidity is considerably increased, but it still has sufficient longitudinal flexibility to enable it to be wound in curves of radii of, for example, ten or twenty centimeters. The smoothing of the hollow cord makes it possible to cover it with a membrane of uniform thickness without significant danger of perforation.

The present invention will now be illustrated, merely by way of example with reference to the accompanying drawing in which the FIGURE represents, schematically, a very greatly enlarged cross-sectional view of a typical assembly according to this invention.

The original external profile of the textile sheath forming the cord is represented by the broken line 1. The external profile of the textile sheath after treatment is denoted by 2. The internal profile of the textile sheath defining an axial channel, 3, is denoted by 4. In the embodiment illustrated, the textile sheath consists of braided multi-strand yarns, 5.

It can be seen that although the original external profile and the internal profile of the textile sheath are substantially circular, they are very uneven. In contrast, the external profile of the sheath after treatment is uniformly circular; the cross-section of the sheath is thus circular. It can also be seen that, over the outer surface of the textile sheath, the yarns are flattened at the surface and imbricated with one another, that is to say bent to occupy the least dead space. It can also be seen that the yarns, fibres or filaments which appear at the surface of the sheath are smoothed down on the latter, before application of the membrane, and this prevents the membrane from being perforated subsequently.

A knitted, braided or woven sheath, or a sheath made of non-woven material, can be used as the textile sheath. Braided or woven sheaths are particularly suitable. A hollow sheath, generally manufactured on a mandrel, should be used. This sheath can consist of yarns or fibres of natural, artificial and/or synthetic material. Advantageously, it comprises synthetic materials which soften gradually on heating and/or heat-shrinkable materials. A textile sheath based on polypropylene yarns is particularly suitable. The yarns can be single-strand or, preferably, multi-strand. The number of strands in the multi-strand yarns is generally between 5 and 200, and preferably between 20 and 100. The gauge of the yarns is suitably between 10 and 1,000 deniers, and preferably between 50 and 500 deniers. The yarns or fibres can be impregnated with a polymerisable resin before they are used to form a sheath.

The hollow cord generally consists of a single textile layer (or web). It can, however, also consist of several concentric superposed textile layers. These textile layers can be of the same or different materials from one another. For example, a hollow cord can consist of a woven sheath covered by a concentric braided sheath fitted over the above.

The external diameter of the compressed hollow cord, before application of the membrane, is generally between 1 and 10 millimeters, and preferably between 1.5 and 3 mm. Furthermore, the ratio of the external diameter to the internal diameter of the compressed hollow cord is generally between 2 and 5.

It is simple and economic to manufacture a tubular membrane-support assembly of the present invention.

It is possible to start with a usual type of hollow cord which is then passed through a convergent tube. This tube is preferably cylindro-conical and its walls are smooth, for example polished. In this way, the cord is given an accurately circular cross-section of definite size, its external surface is smoothed and its internal and external diameters are reduced simultaneously and substantially proportionately.

The cord is generally moved by pulling it through the convergent tube. In order to limit the total tensile force applied to each section of the cord, it can be advantageous to pass the hollow cord through several consecutive convergent tubes and, at the outlet of each tube, to exert a tensile force such that the sum of the tensile forces applied from all the tubes is substantially equal to the total tensile force necessary to obtain the desired compression of the cord.

Advantageously, this mechanical means is combined with thermal means. Thus it is preferred to heat the convergent tube or tubes to temperatures which, for example, cause the yarns and/or the fibres, of which the cord is made, to soften.

It is thus possible to reduce the external diameter of a hollow cord by 5% to 50%, and preferably by 10% to 20%. A substantially proportional reduction of the internal diameter of the hollow cord takes place at the same time. Usually, a reduction of 10% to 20% of the external diameter of a hollow cord can be achieved by passing this cord through a single heated convergent tube. The structure of this cord thus becomes more uniform, more compact and denser, but remains permeable to fluids.

It is desirable to use a woven sheath comprising heat-shrinkable circular weft yarns and substantially longitudinal warp yarns. When the sheath is passed through the heated tube or through a zone heated to a temperature higher than the softening point of the heat-shrinkable yarns, the weft yarns shrink and disappear inside the sheath and the warp yarns appear more on the outside. This arrangement can be further accentuated by the method of weaving used, which improves the adhesion of the membrane to the textile sheath.

A compressed hollow cord is thus obtained, the external surface of which is cylindrical and smooth. This now has to be covered with a semi-permeable tubular membrane. This can be carried out by any known means; for example, it is possible to form a membrane by coating the cord directly with a film-forming solution from which the solvent is evaporated. Such techniques are described in, for example, French Pat. Nos. 1,426,548 and 1,506,402, as well as in U.S. Pat. No. 3,446,359.

Alternatively, it is possible either to form a sheath with yarns and/or fibres impregnated with an adhesive resin, or to impregnate the textile sheath with resin before forming a membrane, or to combine these two techniques. The impregnation of the sheath is generally followed by drying and then curing or polymerising the resin. These operations can be carried out either before or, preferably, after the operations of compressing the cord; they can also be interposed between two consecutive operations of compressing the cord. It is generally preferable to use only very small amounts of adhesive resin so that the sheath retains its porosity and sufficient longitudinal flexibility.

The sheath can be impregnated in accordance with various known processes, for example by immersion, spraying, knife-coating, extrusion or brushing. The resin must anchor itself to the yarns of the textile sheath and must be retained only in small amounts to prevent clogging the interstices between the yarns. Impregnation can be carried out right through but is preferably carried out only at the surface.

Water-repellent substances possessing good chemical resistance to the treated fluids, for example to sea-water or to soft water, are generally employed as resins. Thermosetting resins, for example phenolic resins, polyester resins and epoxy resins are preferably employed. Typical solvents include alcohols, formaldehyde, toluene, xylene and trichloroethylene and mixtures thereof.

It can be seen that all these operations can be carried out automatically and continuously and under economically advantageous conditions. The semi-permeable tubular assembly according to the invention can thus be manufactured continuously and in very great lengths. It then suffices to cut it into sections and to assemble the sections to form fluid-separating apparatuses. It is possible, for example, to assemble these sections in bundles and then to seal them in a leakproof manner near their ends, the latter opening freely beyond the leakproof zone. In order to construct these fluid-separating apparatuses, it is of course possible to apply known techniques for constructing apparatuses possessing semi-permeable tubular components.

The membrane thus formed on a flexible cord can withstand high pressures, for example of the order of 50 bars, without undesirable deformation.

These semi-permeable tubular assemblies according to the invention can be used especially for the separation, purification or concentration of fluids, be they liquids or gases, in accordance with the techniques of reverse osmosis, ultrafiltration, gas permeation or pervaporation.

The following Examples further illustrate the present invention.

EXAMPLE 1

A flexible hollow cord is used which consists of a textile sheath made of polypropylene yarns woven with a satin-type weave with five strands caught up and 2 dropped. The warp consists of 86 multi-strand yarns of 200 deniers, doubled, with 340 turns to the meter. The weft consists of multi-strand yarns of 200 deniers, doubled, with 340 turns to the meter. It is produced by 20 pirn passes to the cm per face on both faces.

The smoothing, calibration and compression of the cord are then carried out by drawing it through a convergent cylindrical-conical tube heated to a temperature of 150°C, which causes the surface of the sheath to soften. The smoothing causes all the fibres, strands and yarns which stuck out from the cylindrical surface of the cord to disappear and thus gives the cord a smooth external surface. The cord is thus compressed and its external and internal diameters are respectively reduced from 3.2 mm and 1 mm to 2.6 mm and 0.8 mm.

A solution of cellulose acetate is then deposited on the cord, working in accordance with the techniques described in French Pat. Nos. 1,426,548 and 1,506,402. The combination is kept at a temperature of 0°C for 30 minutes and is then heated to a temperature of 85°C for 10 minutes. The membrane thus formed on the cord has a substantially uniform thickness; it adheres suitably to the support cord, even when the latter is bent into an arc of a circle of radius 100 mm.

The semi-permeable combination thus produced is cut into a section of length 45 cm which is attached along the axis of a cylindrical chamber closed at its ends by two stoppers, the semi-permeable combination passing through the stoppers into which it is sealed in a leakproof manner with epoxy resin. The cylindrical chamber is equipped with two side tubes which make it possible to set up a flow of impure water under pressure inside the chamber. Pure water, which has passed through the membrane by reverse osmosis, is collected at the ends of the semi-permeable combination.

The following results are obtained, wherein Q denotes the rate of flow of pure water expressed in liters per day/m$^2$ of membrane and the degree of rejection denotes, as a percentage, the ratio between the amount of salt held back by the membrane and the original amount of salt.

With an impure water of degree of hardness = 32.8, at 20°C, under 25 bars:

$Q = 720$ l/m$^2$/day, with a degree of rejection of 94%.

By way of comparison, with a similar cord produced in accordance with an identical process and differing from the previous cord (according to the invention) only by the fact that the central channel is replaced by a core consisting of a longitudinal bundle of 52 single-strand filaments of diameter 18/100 mm made of polypropylene, the following results are obtained:

With an impure water of degree of hardness = 32, at 20°C, under 60 bars:

$Q = 220$ l/m$^2$/day, with a degree of rejection of 96.6%.

It is thus seen that, although the cord according to the invention is being subjected, in this particular case, to lower pressures than the solid cord, it makes it possible to obtain a much higher rate of flow of pure water.

EXAMPLE 2

A hollow cord is used which differs from that described in Example 1 only by the fact that it is impregnated with resin. After compression, the cord is brush-coated with a resin formed by condensing one mol of phenol with 3 mols of formaldehyde in the presence of sodium carbonate as catalyst, and dissolved in ethyl alcohol. Curing is achieved by passage through an oven at a temperature of 110°C for a period of 30 minutes. A second smoothing of the cord, under compression, is then carried out. The membrane is applied as in Example 1.

The following results are obtained:

With an impure water of degree of hardness = 32, at 20°C, under 25 bars:

$Q = 643$ l/m$^2$/day, with a degree of rejection of 93.7% under the same conditions, but under 60 bars: $Q = 1,320$ l/m$^2$/day.

It can thus be seen, by referring to Example 1, that impregnation with a resin slightly decreases the rate of flow of pure water, for the same pressure. However, as it is possible to work under as high pressures as with a cord with a core made of polypropylene yarns, as described above, it can be seen that, all other things being equal, the rate of flow of water is very substantially increased.

EXAMPLE 3

The starting material is a hollow cord, not impregnated with resin, according to Example 1, of external diameter 3.1 mm and internal diameter 1 mm, which is compressed in such a way that its external diameter is reduced successively to 3 mm; 2.7 mm; 2.5 mm and 2.2 mm. The membrane is applied as in Example 1. It is observed that this cord then resists respective external pressures of 5 bars; 20 bars; 40 bars and 55 bars.

EXAMPLE 4

The starting material is a hollow cord as in Example 1 (not impregnated with resin), of external diameter 3.1 mm and internal diameter 1 mm. It is compressed in such a way that its external diameter is reduced successively to 2.7 mm and then to 2.2 mm. The membrane is applied as in Example 1.

The following results are obtained with the resulting membrane respectively:

With an impure water of degree of hardness = 32, at 20°C, under 25 bars:

$Q_1 = 667$ l/m$^2$/day, with a degree of rejection of 90.5 and $Q_2 = 920$ l/m$^2$/day, with a degree of rejection of 89.2.

It can thus be seen that the compression undergone by the hollow cord maintains its walls sufficiently permeable for the rate of flow of pure water obtained not to be reduced.

We claim:

1. Process for the preparation of a flexible semi-permeable tubular assembly which consists essentially of a cord comprising a textile sheath, a semi-permeable membrane on said sheath, said sheath being composed of yarns and having an internal surface which defines an axial channel which communicates with the exterior, said assembly having an external surface substantially uniform in cross-section and consisting essentially of flattened filaments, said filaments being imbricated against one another leaving substantially no dead space therebetween which comprises smoothing the external surface of a hollow textile cord by passing it through at least one convergent tube so as to compress its structure and reduce its external diameter by 5% to 50%, and then coating the cord with a semi-permeable membrane.

2. Process according to claim 1, in which the convergent tube or tubes are heated to a temperature which causes the fibres of the cord to soften.

3. Process according to claim 1, in which the compressed cord is covered with a film-forming solution which, after evaporation of the solvent, forms a semi-permeable membrane.

4. Process according to claim 1, in which the hollow cord is heat-shrunk by passing it through a zone which is at a temperature which is sufficient to cause the heat-shrinkable yarns and/or fibres present in the cord to soften.

5. In a method of purifying or concentrating a fluid by reverse osmosis, ultra-filtration or gas permeation using a semi-permeable membrane, the improvement wherein the membrane is an assembly as produced by the method of claim 1.

* * * * *